(12) United States Patent
Rippington (10) Patent No.: US 6,319,054 B1
(45) Date of Patent: Nov. 20, 2001

(54) ELECTRICAL CONNECTOR

(75) Inventor: David Rippington, Newmarket (GB)

(73) Assignee: AVX Corporation, Myrtle Beach, SC (US)

( * ) Notice: Subject to any disclaimer, the term of this patent is extended or adjusted under 35 U.S.C. 154(b) by 0 days.

(21) Appl. No.: 09/728,576

(22) Filed: Nov. 30, 2000

(51) Int. Cl.⁷ .................................................... H01R 3/00
(52) U.S. Cl. ............................................ 439/500; 310/324
(58) Field of Search .................................. 439/500, 627, 439/620, 852; 310/324, 354, 356

(56) References Cited

U.S. PATENT DOCUMENTS

| | | | |
|---|---|---|---|
| 3,960,424 | 6/1976 | Weisenburger | 439/66 |
| 4,295,009 | * 10/1981 | Weidler | 179/110 |
| 4,553,192 | 11/1985 | Babuka et al. | 361/743 |
| 4,578,545 | * 3/1986 | Phillipson | 179/178 |
| 4,674,161 | * 6/1987 | Edinger et al. | 29/25.35 |
| 4,965,483 | * 10/1990 | Abe et al. | 310/324 |
| 5,213,513 | * 5/1993 | Brown et al. | 439/68 |
| 5,259,769 | 11/1993 | Cruise et al. | 439/65 |
| 5,378,160 | 1/1995 | Yumibe et al. | 439/66 |
| 5,967,800 | 10/1999 | Bishop | 439/74 |
| 6,142,823 | * 11/2000 | Ishibashi | 439/500 |
| 6,220,892 | 4/2001 | Bishop | 439/500 |

* cited by examiner

Primary Examiner—Tulsidas Patel
(74) Attorney, Agent, or Firm—Dority & Manning, P.A.

(57) ABSTRACT

A miniature electrical connector device includes an insulating body member having electrically conductive feet extending from the body. The device may be configured for interconnecting subassemblies of electronic products such as cellular telephones and the like. The connectors may be used to engage a loudspeaker, microphone, or other unit to another conductive member, including for example a circuit board. A pair of connector elements extend beyond an insulating body for electrical contact with a conductive member. Further, a metallic or conductive can having an outer engaging surface operatively connected to a loudspeaker coil may be provided. Channels or divisions in the metallic can may be configured to receive the foot of a connector element within the channel. Connector elements include a closed end or an open end defined by extending arms. The connector may provide outwardly facing contact surfaces defined on extending arms for mating contact with respective pads of circuit board assemblies.

27 Claims, 13 Drawing Sheets

ELECTRICAL CONNECTOR

FIELD OF THE INVENTION

This invention pertains to electrical connectors, and in particular, miniature connectors that enable secure and efficient electrical interconnections between electronic subassemblies such as printed circuit boards (PCB's) and electronic devices.

BACKGROUND OF THE INVENTION

Prior art methods have been employed for some time to interconnect electronic subassemblies, such as printed circuit boards. For example, in connecting electronic components such as loudspeakers and the like to circuit boards within cellular phones, connectors have been used to mate such electronic components to the circuit board.

A primary concern for cellular phones and other relatively small electronic devices is the limited space available to connect boards or subassemblies within the electronic device. Using conventional connectors, conductive electrical metallic alloy contacts are used to flex in a pressing action against other electrical devices, such as a contact pad on a circuit board. This pressing action forms a secure electrical pathway. As the need for smaller connectors has increased, it has become more difficult to provide for a secure electronic connection in a limited amount of space.

Electrical connectors using metallic electrical contacts must provide for a certain minimum beam length in order to facilitate enough flexibility to engage an electrical surface securely. Without a certain minimum or threshold length, the metal used to construct the elongated contacts cannot withstand the stress and pressure of flexibly engaging an electrical contact surface. The miniaturization of connectors, therefore, has made it more difficult to provide for a metallic contact beam of sufficient length and strength to provide a secure connection. In modern connectors, the beam length of the metallic contacts has been minimized such that the total length of the beam approaches the size (or diameter) of the insulative body which itself holds these metallic contacts in place. Thus, it is highly desirable to provide for a minimum beam length for electrical contacts using a smaller total connector body diameter.

SUMMARY OF THE INVENTION

It is a principal object of the present invention to provide an improved electrical connector particularly suited for interconnecting loudspeakers, microphones, and other electronic subcomponents.

Still another object of the invention is to provide a connector that exhibits, in a small overall size or package, a maximized beam length for electrical contacts to facilitate greater miniaturization of the overall connector.

Additional objects and advantages of the invention will be set forth in part in the following description, or may be apparent from the description, or may be learned through practice of the invention.

An electrical connector device for engaging a loudspeaker to another conductive member is provided in one embodiment of the invention. The device includes a circuit board. Further, the connector comprises an insulating body having an inner surface and an outer surface. In general, the connector is integrated into the electronic device, or loudspeaker, and is not a separate entity. At least one pair of connector elements are configured within said body, each said connector element comprising contact feet having a proximal end and a distal end. The distal end of the contact feet extend generally beyond the outer surface of the insulating body for electrical contact with a conductive member. Further, the proximal end of the contact feet extend into the receptacle for electrical contact with the loudspeaker. The contact feet are configured to flex along their length to provide for pressing contact against the conductive member.

Additionally, a conductive can having an outer engaging surface operatively connected to the loudspeaker is provided. The can also includes an interior, and contains at least one channel on its interior.

The channel of the can is configured to receive the foot of a connector element, thereby facilitating a path for the connector element within the channel that provides for pressing contact of the connector element against the conductive member. This pressing contact enables the overall length of the connector element to be maximized relative to the diameter of the electrical connector device.

The electrical connector device further comprises, as one option, an orientation slot to facilitate placement of the connector during manufacture. The electrical connector device is provided, in another embodiment, such that the proximal end of the contact feet comprise electrical contact pads.

In one aspect of the invention, the electrical connector device is provided wherein the contact feet are S-shaped. The electrical connector device is also provided in which the length of the contact feet is greater than the diameter of the insulative body.

In one embodiment of the invention, an electrical connector device is provided in which the can comprises an upper flat surface, wherein the can electrically engages a loudspeaker upon its upper surface.

In another embodiment of the invention, the electrical connector contact feet extend across the width of at least a portion of the can and at least a portion of the body. In other aspects of the invention, the can comprises a portion of a carrier strip for a plurality of electrical connector devices.

In one aspect of the invention, an electrical connector device is provided in which the contact feet flex along their length to provide for pressing contact against a printed circuit board (PCB). In one optional embodiment, the electrical connector device includes a carrier strip that comprises iron.

In one embodiment, an electrical connector device is provided for engaging a loudspeaker to another conductive member, including a circuit board, in a stacked configuration. In this alternative embodiment, the connector comprises an insulating body having an inner surface and an outer surface. Further, at least one connector element is configured within the body. The connector element comprises contact feet, a proximal end and a distal end. The distal end of the connector element extends beyond the outer surface of the insulating body for electrical contact with a conductive member, and the proximal end of the connector element extends into the receptacle for electrical contact with the loudspeaker. In addition, a pad projection is located along the length of the connector element. A can having an outer engaging surface operatively connected to the loudspeaker is also provided, the can further comprising at least one channel. The channel of the can is configured to receive the connector element.

In one aspect of the invention, the electrical connector also comprises a top ridge which facilitates "pick and place" automated manufacturing. In one embodiment, the electrical connector is provided with at least one connector element that is L-shaped. The electrical connector device also is provided in which the connector element has no more than one stress point along its length while flexed. In other embodiments, more than one stress point is provided in the connector element.

An electrical connector device is also provided in which the body comprises at least one keyway aperture. In one embodiment, the electrical connector device provides at least two connector elements generally parallel to each other within the body, the elements forming a top space between each other. In one aspect of the invention, the electrical connector device is provided in which the pad projections to interact with speaker connection wires.

One embodiment of the invention further includes a top space that occupied by an air flow reduction means. In loudspeaker applications, the air flow between and around the electrical contacts (i.e. through the device) is very important to maintain the acoustical quality of the loudspeaker that is associated with the connector. An air flow reduction means may increase the sound quality of the loudspeaker to which the connector is attached.

The electrical connector device also is provided in which the pads of the device comprise an upper surface and a lower surface, in which the air flow reduction means (or upper cap) extends over the upper surface of the contact elements. In one aspect of the invention, the electrical connector device may include an air flow reduction means which extends below the lower surface of the pads (i.e., sometimes referred to as a "lower cap"). In some applications, an air flow reduction means, or cap, below the pads facilitates a more efficient overall design.

The electrical connector device of the invention may be manufactured in a carrier strip in an assembly line procedure. The techniques for this type of manufacture are known to persons of skill in the art, and provide a convenient means for keeping and storing the devices until they are placed into a cellular phone or other suitable electronic end product.

To aid in precise positioning of the connector element on circuit boards, engaging structures, such as male or female members, may be defined on the body member so that a positioning cap or ridge or similar device may be used to grasp and precisely locate the connector on the circuit board. This structure may also serve as positioning or alignment structure matable with complimenting structure on the circuit boards.

The contacts of the connector comprise, in one embodiment, leaf springs that bend under a load and provide a tensioning force sufficient to keep them in constant physical contact with an electrical contact or pad to develop an electrical circuit.

It should be recognized that a plurality of connector subassemblies according to the invention can be utilized in any number of different configurations. For example, a plurality of connector assemblies could be placed on a single loudspeaker, microphone, or other device in any desired pattern upon a circuit board.

The present connector assembly is not limited by any particular material of construction and, in this regard, any conventional suitable materials may be utilized in the manufacture of the electrical connector device components.

Applicants have found that the particular configurations shown in the inventions of this application are very efficient at retaining the connector elements within the insulating body in contact with their respective conductors without any additional mechanical structures, such as adhesives, solder, and the like. It is a relatively inexpensive procedure to simply mold the connector assembly directly into the body member, with a metallic conductive can being incorporated into the insulative body.

The present invention will be described in greater detail below through preferred embodiments as illustrated in the attached Figures.

Brief Description of the Drawings

A full and enabling disclosure of this invention, including the best mode shown to one of ordinary skill in the art, is set forth in this specification. The following Figures illustrate the invention.

DETAILED DESCRIPTION OF THE INVENTION

Reference now will be made to the embodiments of the invention, one or more examples of which are set forth below. Each example is provided by way of explanation of the invention, not as a limitation of the invention. In fact, it will be apparent to those skilled in the art that various modifications and variations can be made in this invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention, which broader aspects are embodied in the exemplary constructions.

In electrical connectors for microphones, loudspeakers, and other electronic devices, efforts have been made to enable short pieces of metal to act as flexible electrical contacts in a small scale environment. For example, connectors used in cellular telephones and other such devices which are designed to connect electronic subcomponents such as microphones and loudspeakers to the internal telephone assembly usually rely upon flexible metallic electrodes or contacts to provide for electrical connectivity. As such devices become smaller and smaller with technological progress, it becomes more difficult to provide a sufficient contact element length to enable spring-action or flexibility in such devices. Therefore, the geometry that is adopted by contacts within such connectors is very important to ensure a reliable connection, while still achieving miniaturization.

In many connectors, it is desirable to orient the contacts within the connector so that the beam length of the contacts (i.e., the length of the electrical contacts) is maximized as compared to the diameter of the electronic connector device. One method of achieving such a result is to integrate the insulative body with a metallic can as provided in this invention.

Figure 1:
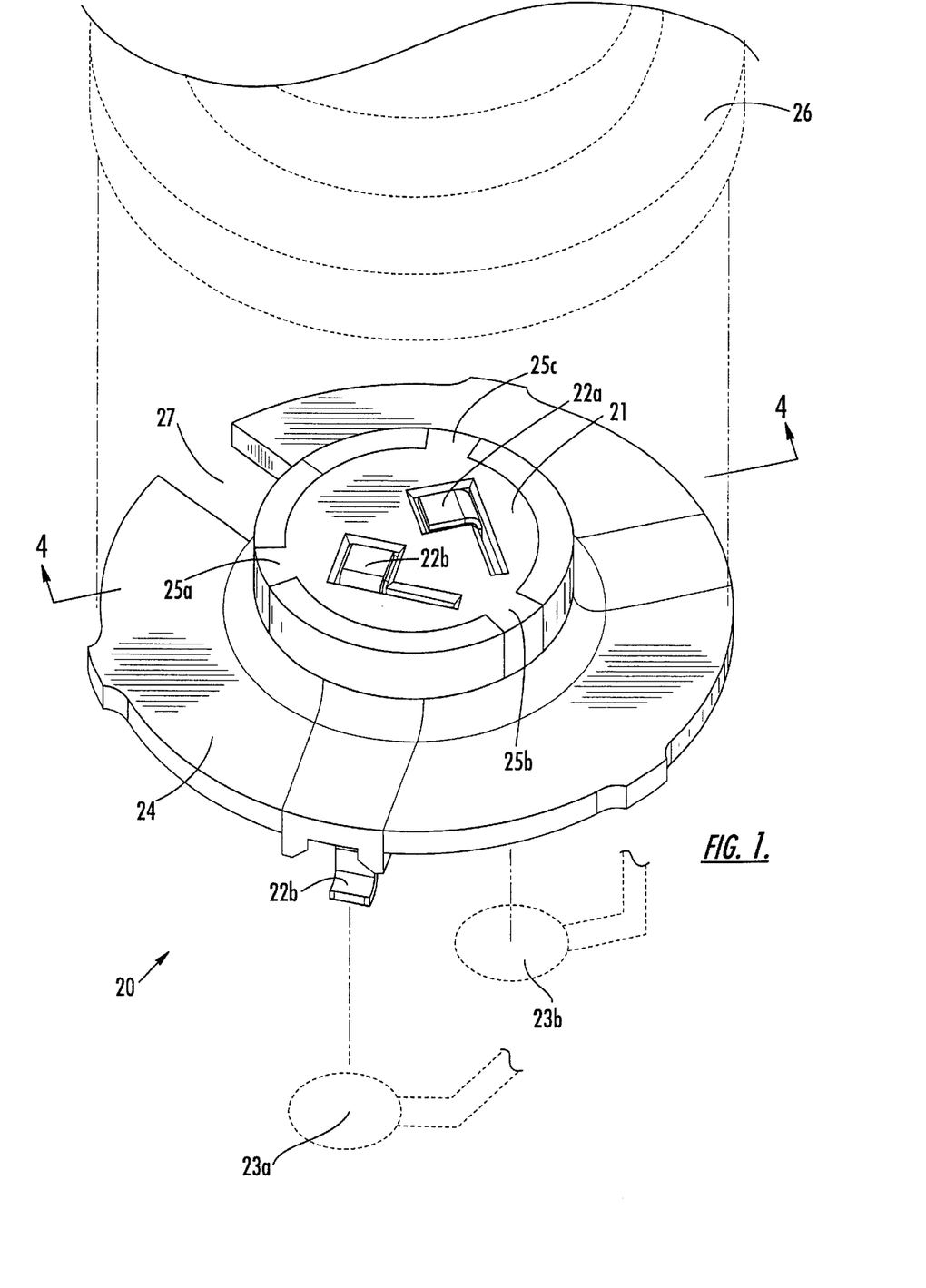
FIG. 1 is a perspective view of one embodiment of the electrical connector of the invention.
Figure 4:
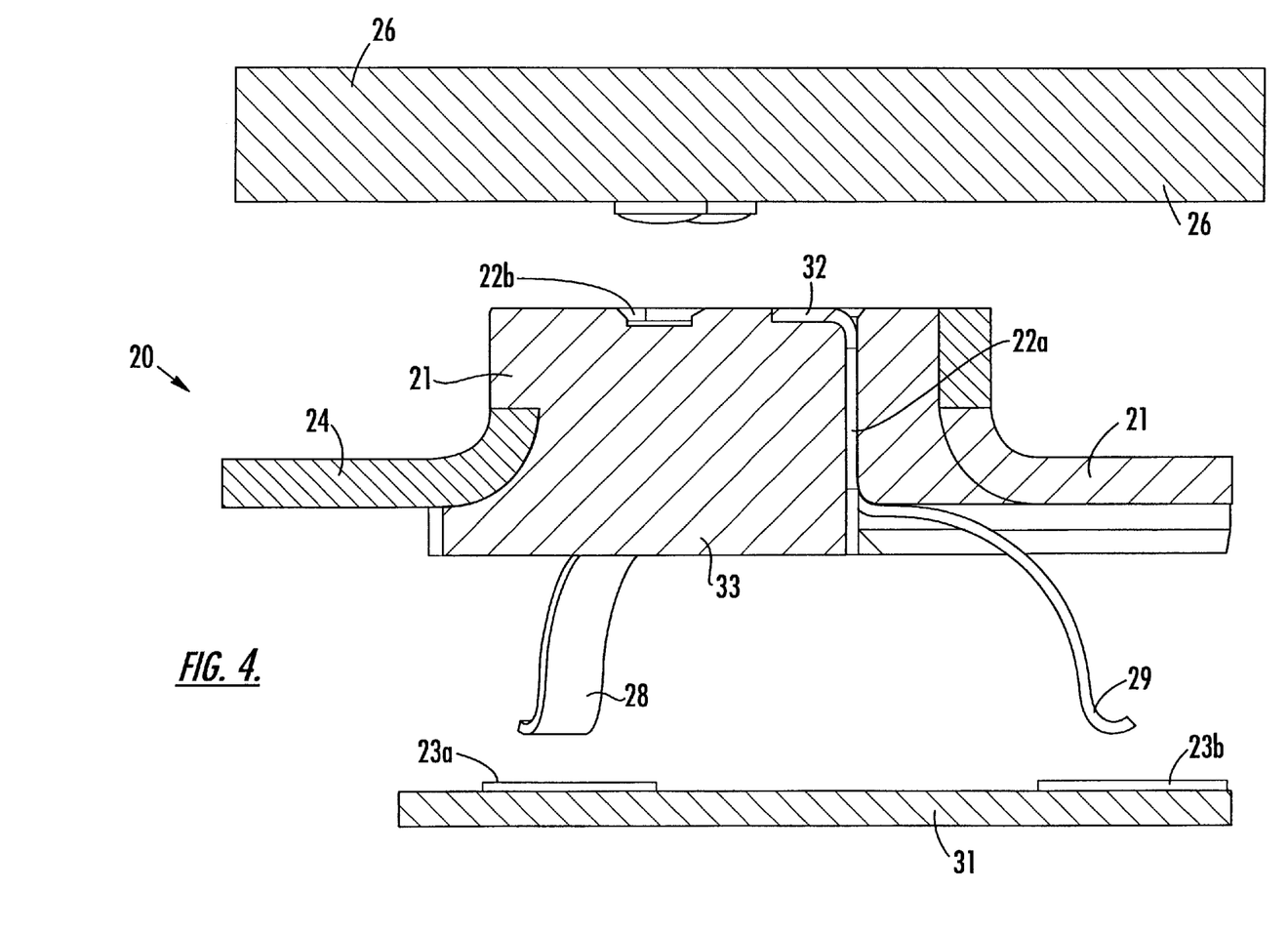
FIG. 4 shows a cross-sectional view of the connector shown in FIG. 1, the cross-section taken along lines 4—4 of FIG. 1.

Turning now to FIG. 1, a connector 20 is shown in perspective view with an insulative body 21 near the center of the connector. Connector elements 22a and 22b are shown near the center of the insulative body, where they form electrical contact pads on the upper surface of the insulative body. Connector elements 22a and 22b typically are welded, in the process of manufacture, to the electronic component onto the conductive members 23a and 23b. The connector engages conductive member 23a and 23b on its lower margin, and the foot of connector element 22b is shown near the lower portion of FIG. 1 where it engages conductive member 23a of a printed circuit board (the printed circuit board is shown in FIG. 4). A circular can 24 surrounds the insulative member.

If comprised of metal, the can may serve as a magnetic electrical conductor. Metal is preferred as a material for the can. In some cases, the can receives the magnetic core of a loudspeaker or a voice coil on its upper surface for electrical communication with an electronic device such as a loudspeaker, microphone or the like. The can includes recesses 25a–c into which portions of the insulative body protrude. An electronic device such as a loudspeaker 26 may engage the connector 20 on its upper surface as shown in FIG. 1. Usually, the connector is integrated into the electronic device by soldering or welding techniques known in the art, and is not usually a stand-alone unit. The rim of the can may include a slot 27 that may be used as an orientation marker when the connector 20 is provided for installation in an electronic handset or a cellular telephone.

Figure 2:
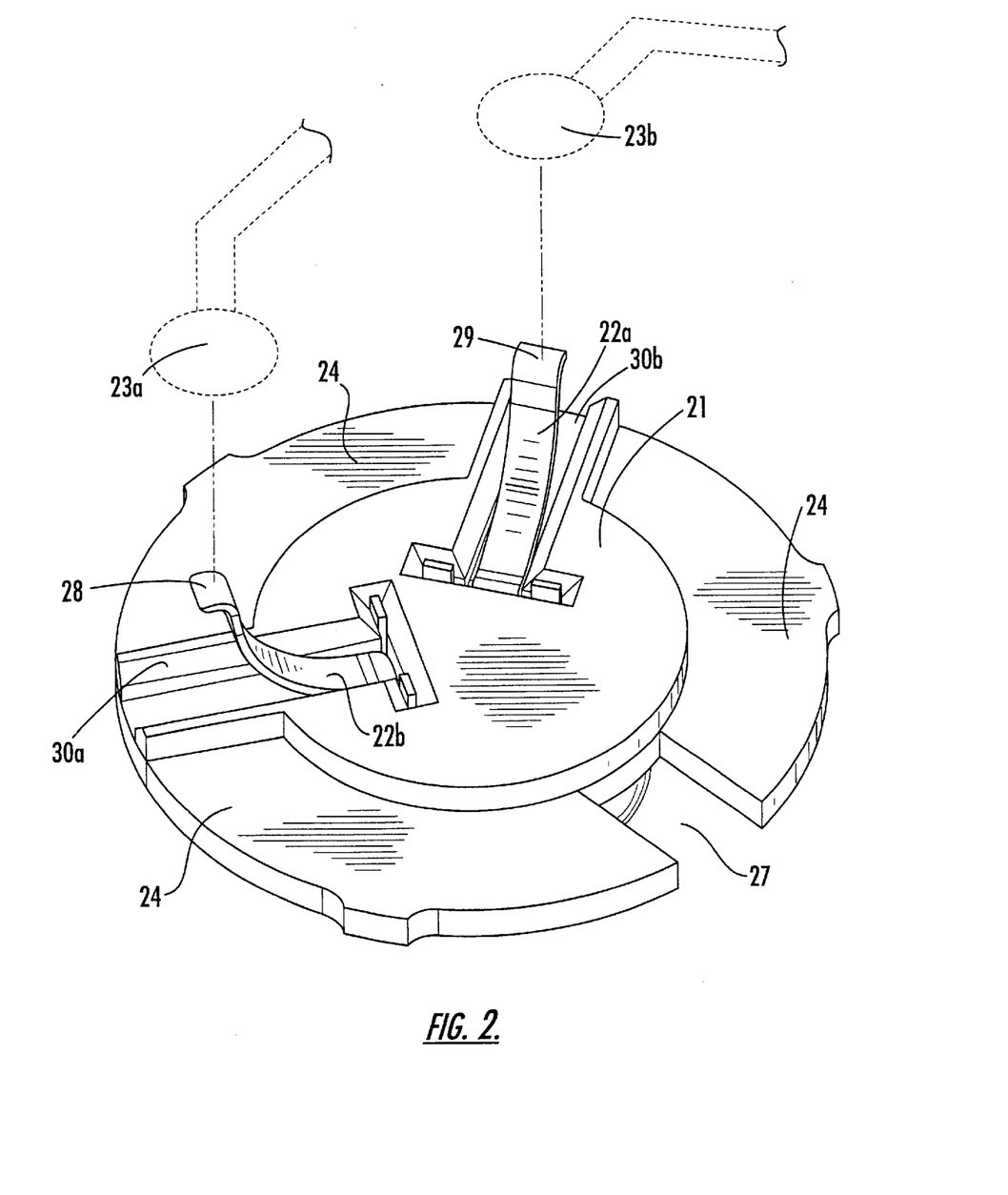
FIG. 2 shows the underside of the connector shown in FIG. 1.
Figure 3:
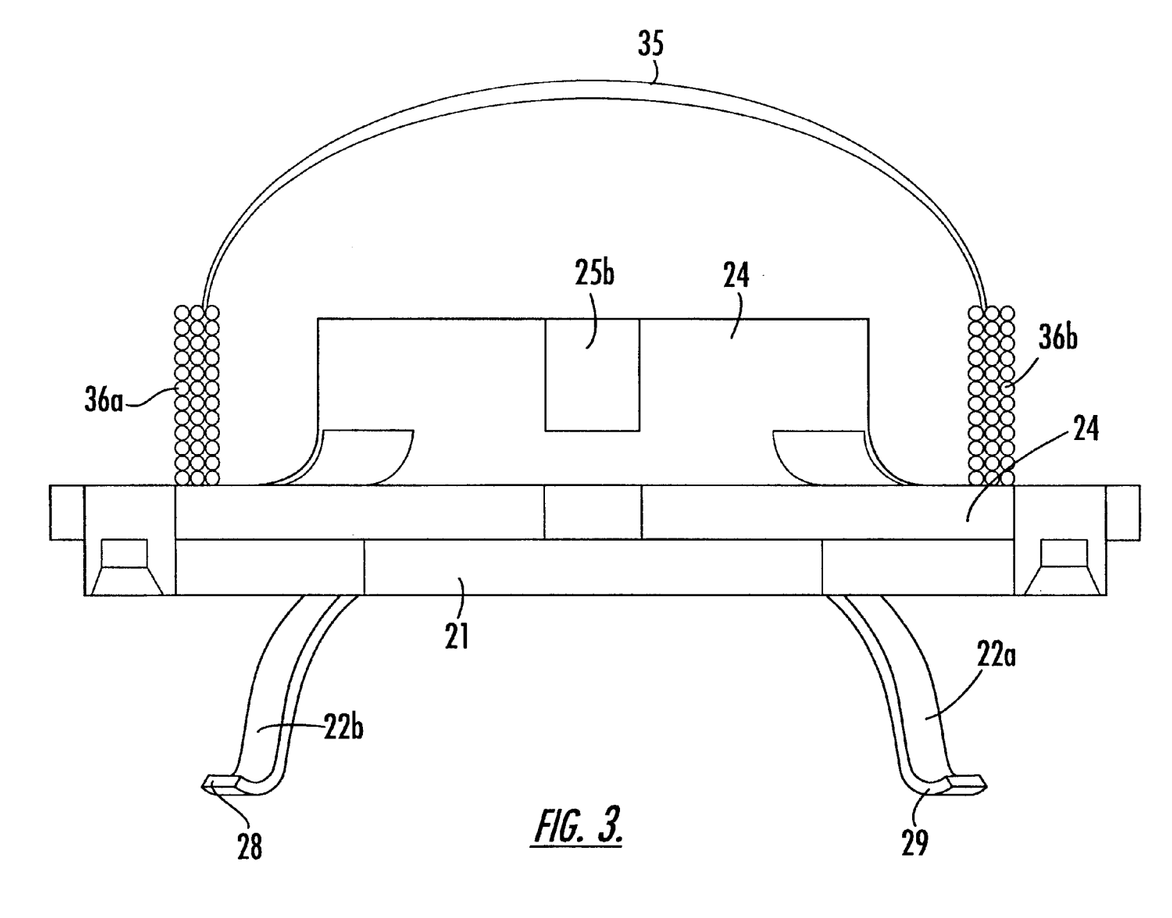
FIG. 3 shows a side view of the connector shown in FIG. 1.

The underside of the connector 20 shown in FIG. 1 is provided in FIG. 2. The distal end 28 of the contact foot 22b and the distal end 29 of the contact foot 22a is shown in FIG. 2. The connector elements 22a and 22b are capable of folding into channel 30a and channel 30b, respectively, when the connector is mated to a printed circuit board. The distal end 28 contacts conductive member 23a of the printed circuit board and the distal end 29 of connector 22a contacts the conductive member 23b of the printed circuit board 31 (printed circuit board is shown in FIG. 4). FIG. 3 shows a side view of the connector shown in FIGS. 1—2. In FIG. 3, voice coil 36a and 36b is shown on either side, connected by the diaphragm 35 that extends over the top of the can 24, as seen in the Figure.

In FIG. 4, a cross-sectional view of the connector 20 is shown, including also the electronic device 26 shown in the upper portion of FIG. 4. A contact pad 32 of connector element 22a is shown at the upper portion of the connector. A lower surface 33 of the insulative body 21 is seen at the lower margin of the connector. The distal ends 28 and 29 of the connector elements 22a and 22b, respectively, are placed in contact with the conductive members 23a and 23b of the printed circuit board 31 when the connector is installed for use. The electronic device 26 may comprise a loudspeaker, microphone, or other subassembly.

Figure 5:
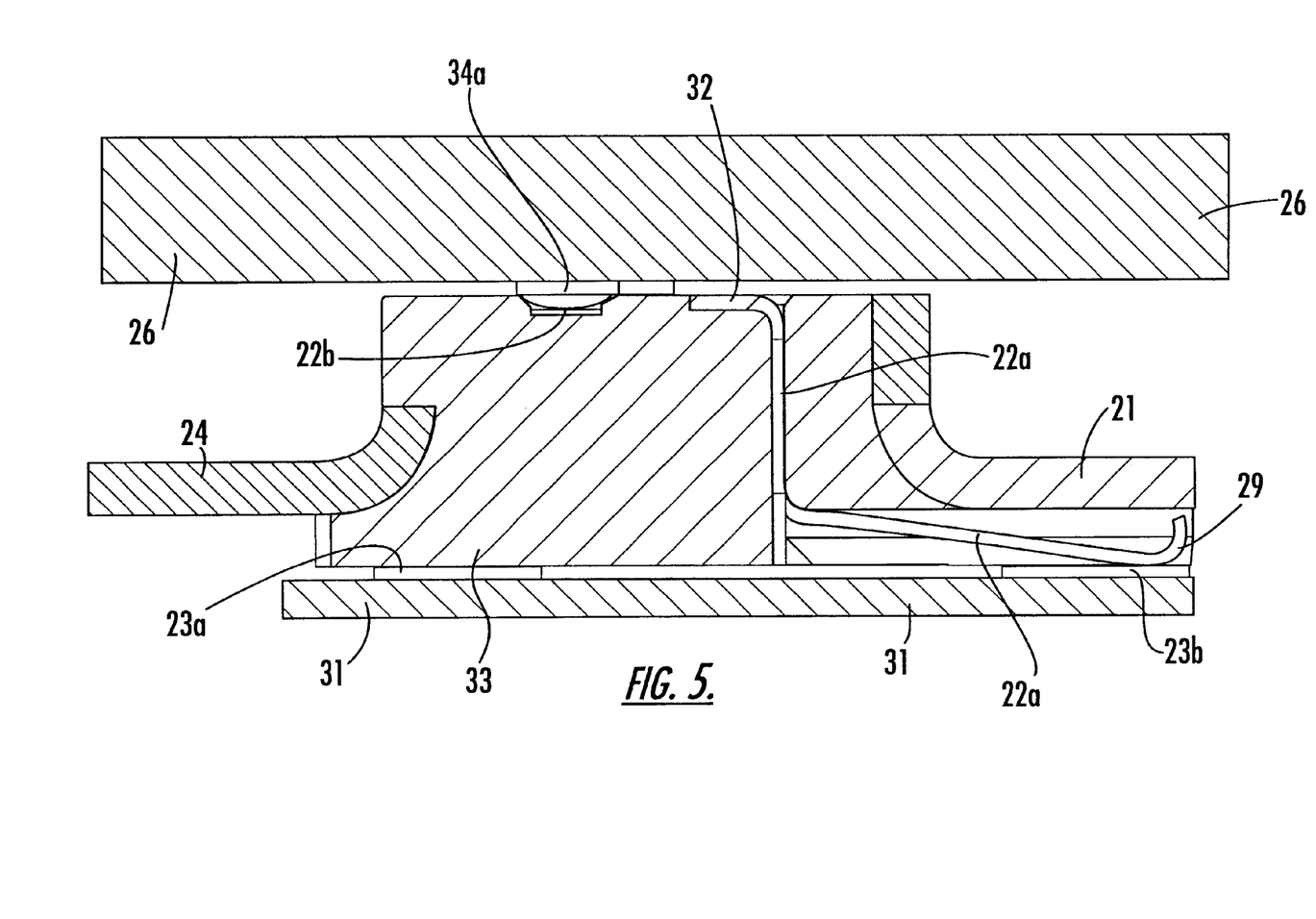
FIG. 5 is a cross-section of the connector shown in FIG. 1 in which the connector has been engaged on its top surface by an electronic component, and on its bottom surface is engaged by a printed circuit board.

FIG. 5 shows the connector of FIG. 4 wherein the connector element 22a is pressed against conductive member 23b to provide electrical communication to the printed circuit board 31. Thus, the connector element 22a is held by spring tension force against the printed circuit board conductive member 23b. In designing the connector elements, it if preferable to have a reduced number of bends, or stress points, along the length of the connector element. In FIG. 5, connector element 22a contains two bends, or stress points, one near the contact pad 32, and one about mid-way along its length. Further, the tip of the connector element is bent at the distal end 29 of the contact foot. The other connector element 22b is also flexibly engaged to conductive member 23a.

Figure 6:
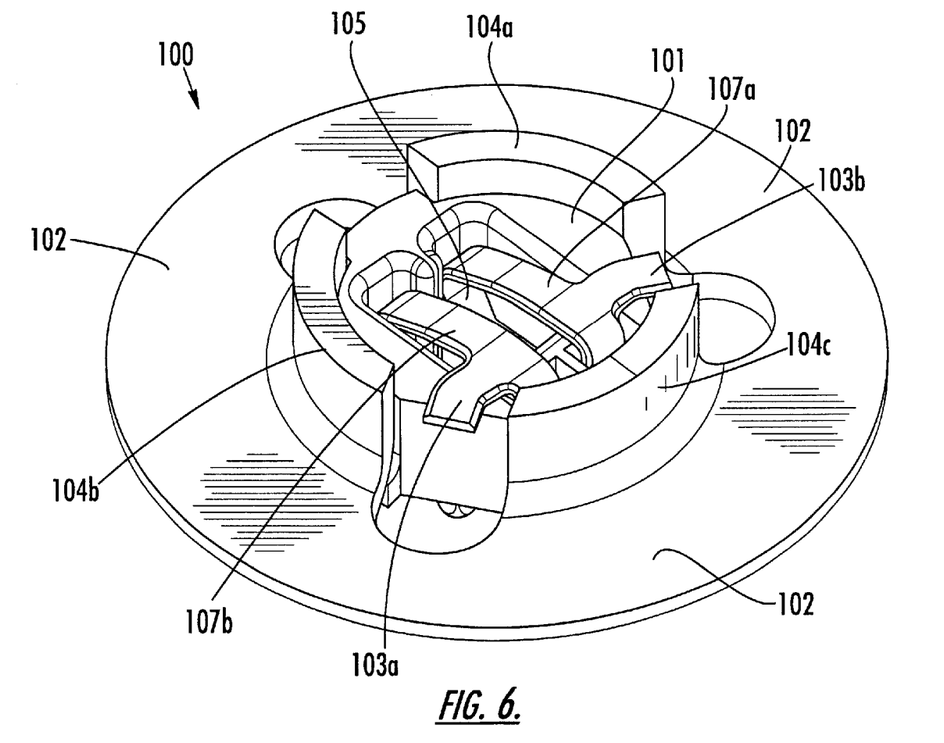
FIG. 6 depicts an alternative configuration of the invention.

In another alternative embodiment of the invention, a connector 100 is provided in which the contact elements form a multi-lobed structure. As shown in FIG. 6, cropped contact tails 103a and 103b emerge out of and above airflow reduction insulator 101. The insulator in this embodiment is designed to reduce the amount of air or space that surrounds the electrical contact elements, which proves useful in connectors that are used for loudspeakers. In a loudspeaker connector, the movement of air through the center of the connector can have a pronounced affect upon the performance of the loudspeaker to which it is connected, and it has been found that in some configurations reducing the airflow along the center of the connector is desirable. In FIG. 6, metal support can 102 is shown as a circular disk of material. In some cases, the can is comprised of metal. It is usually necessary to use a soft magnetic iron for the can in order to adequately provide for a magnetic loudspeaker circuit, for example. Ridges 104a, 104b, and 104c emerge above the airflow reduction insulator 101. Ridges supply a gripping location for pick-and-place manufacturing techniques that use automated gripping devices in the manufacture of cellular telephones and the like which involves the installation of the connectors. Top space 105 is located between the contact elements 107a and 107b.

Figure 7:
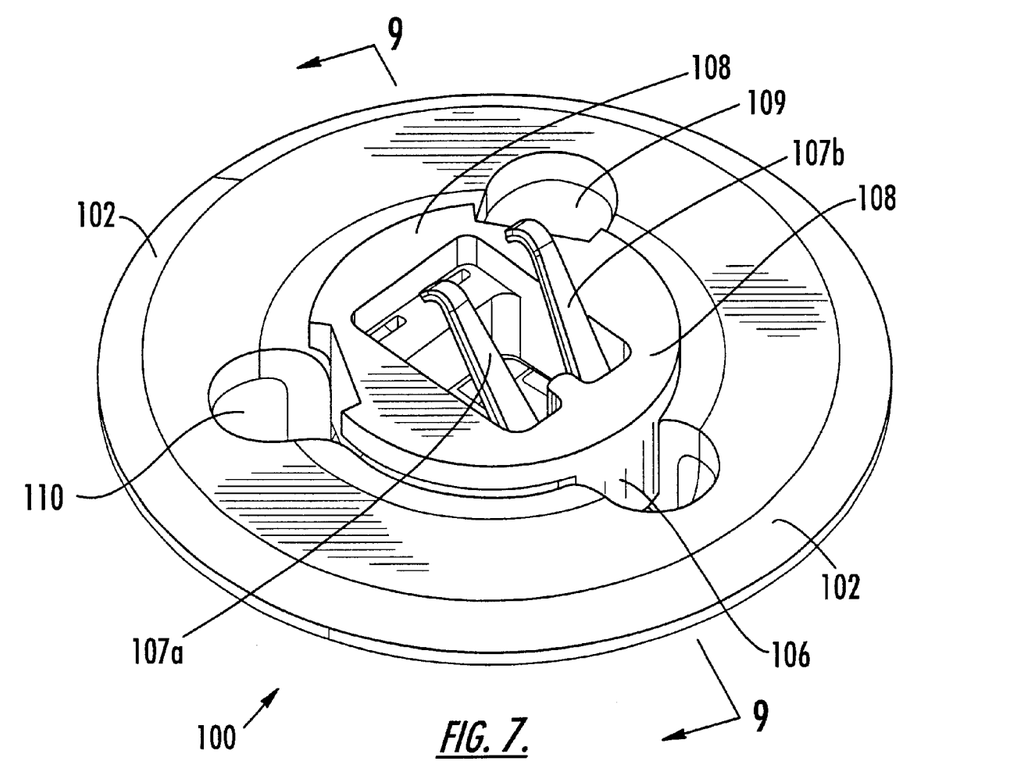
FIG. 7 shows the underside of the connector shown in FIG. 6.
Figure 8:
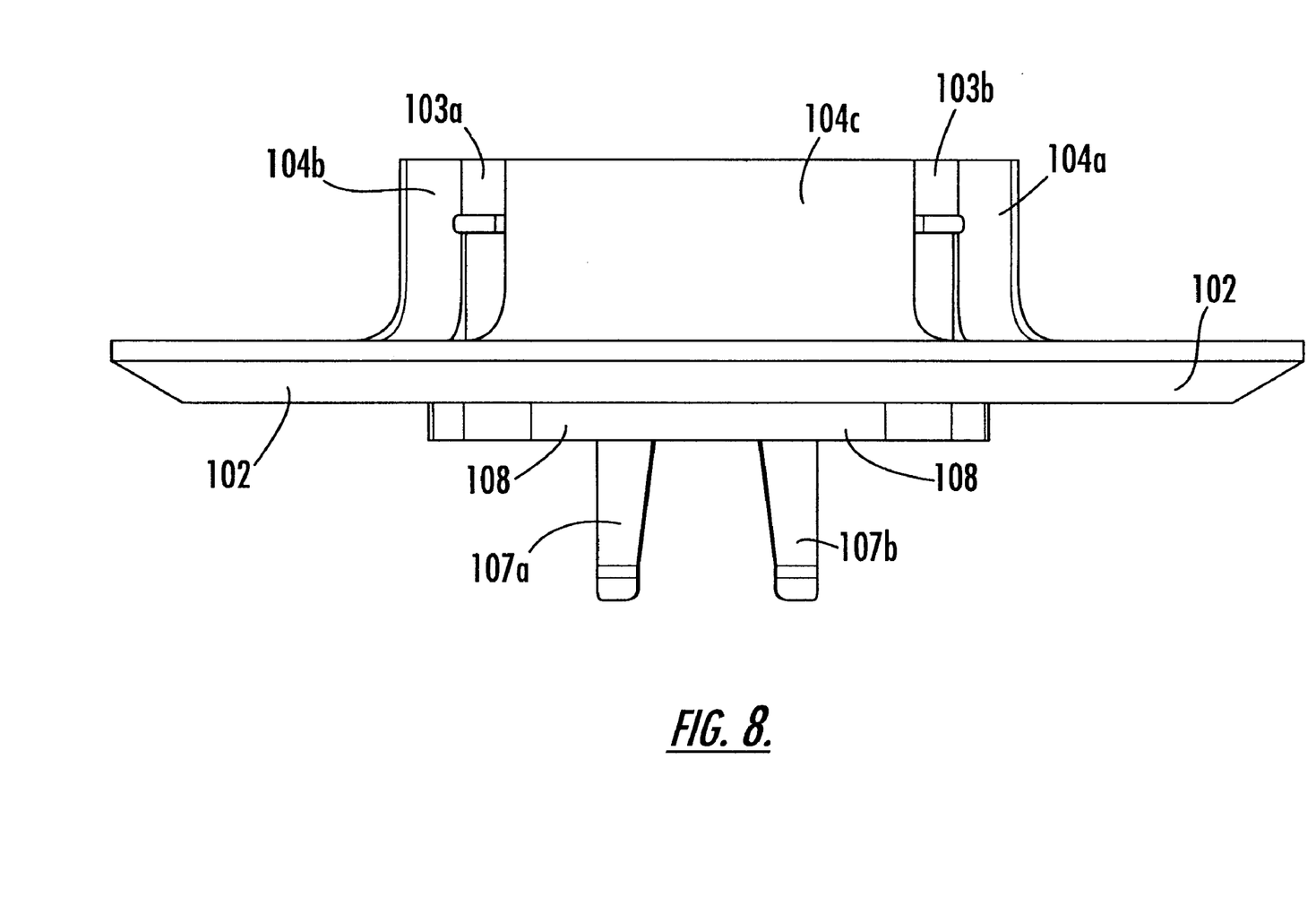
FIG. 8 shows a side view of the connector shown in FIG. 6.
Figure 9:
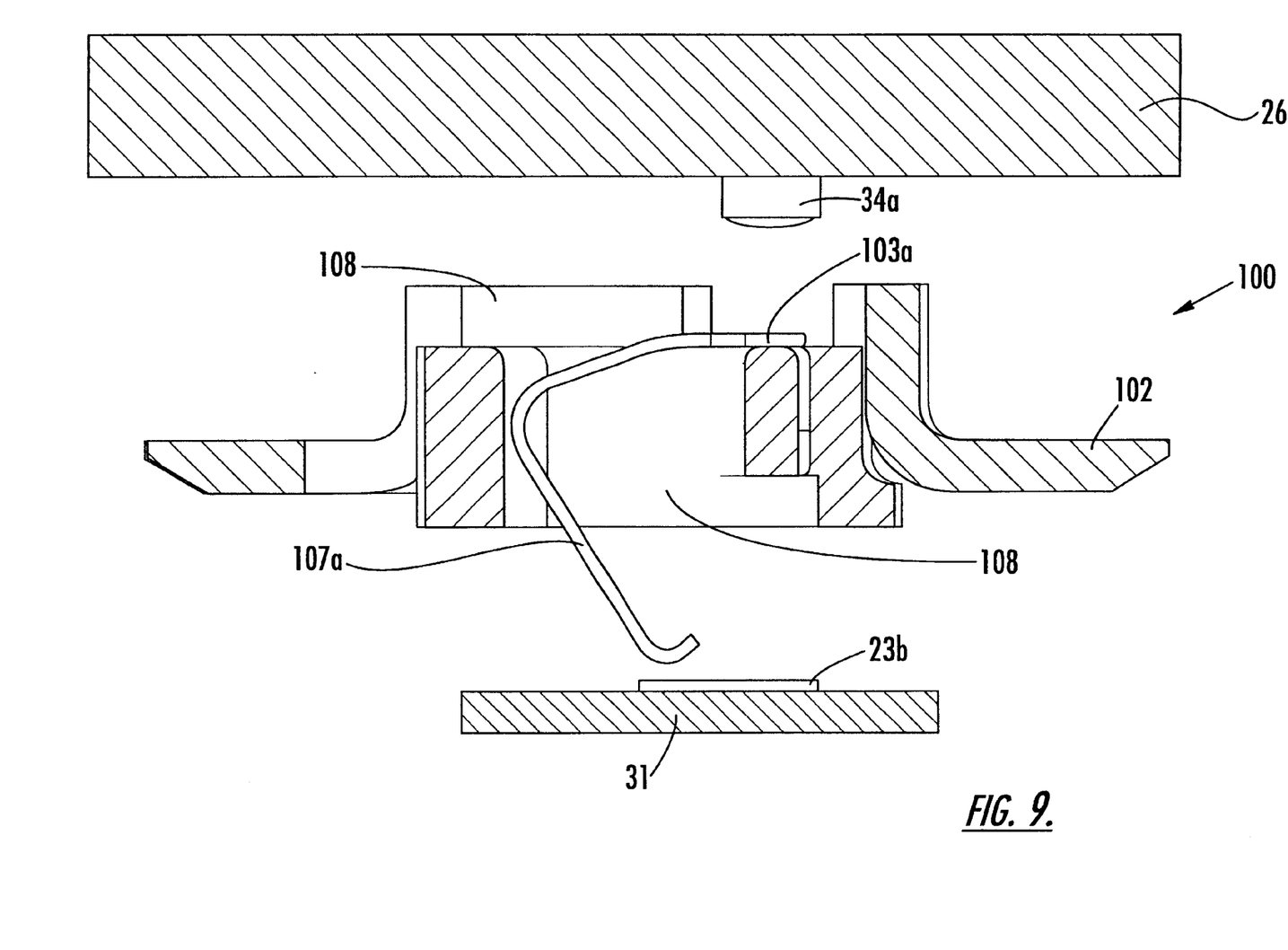
FIG. 9 depicts a cross-sectional view of the connector shown in FIGS. 6—7, the cross-section taken along lines 9—9 of FIG. 7.
Figure 10:
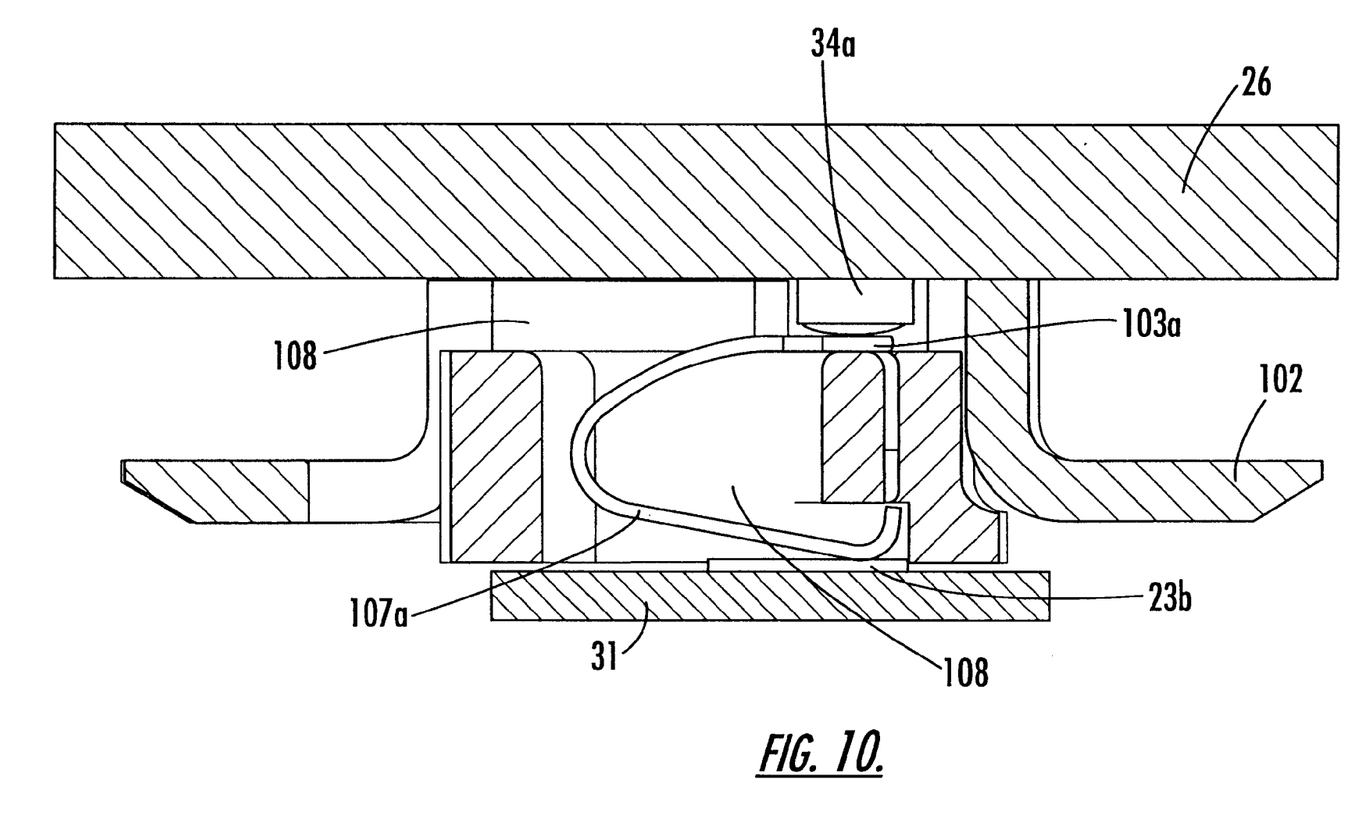
FIG. 10 shows the cross-section of FIG. 9 wherein the connector has been mated on its top surface to an electronic component and on its bottom surface to a printed circuit board.

FIG. 7 shows the underside of the connector 100 shown in FIG. 6. Plastic keyway 106 shows the integration of the insulative body 108 with the metal support can 102. Furthermore, keyway or aperture 109 and aperture 110 are shown in FIG. 7. Contact elements 107a and 107b are shown emerging from the bottom of the connector 100, and such connectors are configured to springingly engage contact pads of a printed circuit board. FIG. 8 shows a side view of the connector shown in FIGS. 6–7, and FIG. 9 shows a side cross-sectional view of the connector shown in FIGS. 6–8. FIG. 10 shows the cross section of FIG. 9 except that the connector in FIG. 10 includes deflected contact elements. Deflected contact element 107a is shown under tension where it electrically engages contact 34a of the electronic device 26 via the cropped contact tail 103a. Contact tails 103a and 103b are typically welded or soldered to the electronic device during manufacture of the unit. Furthermore, at the distal end of the contact element 107a electrical communication is established with conductive member 23b of the printed circuit board (PCB) 31.

Figure 11:
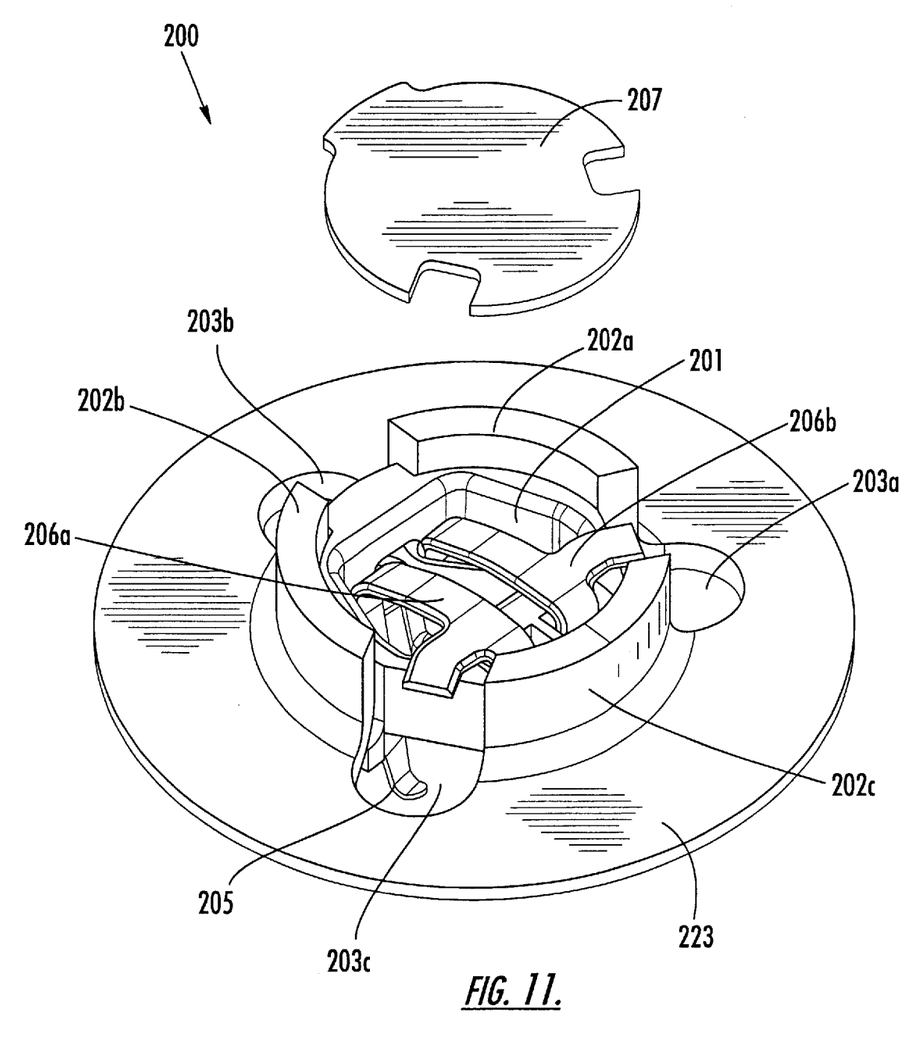
FIG. 11 depicts still another alternative configuration of the invention which utilizes an upper cap to restrict air flow.
Figure 12:
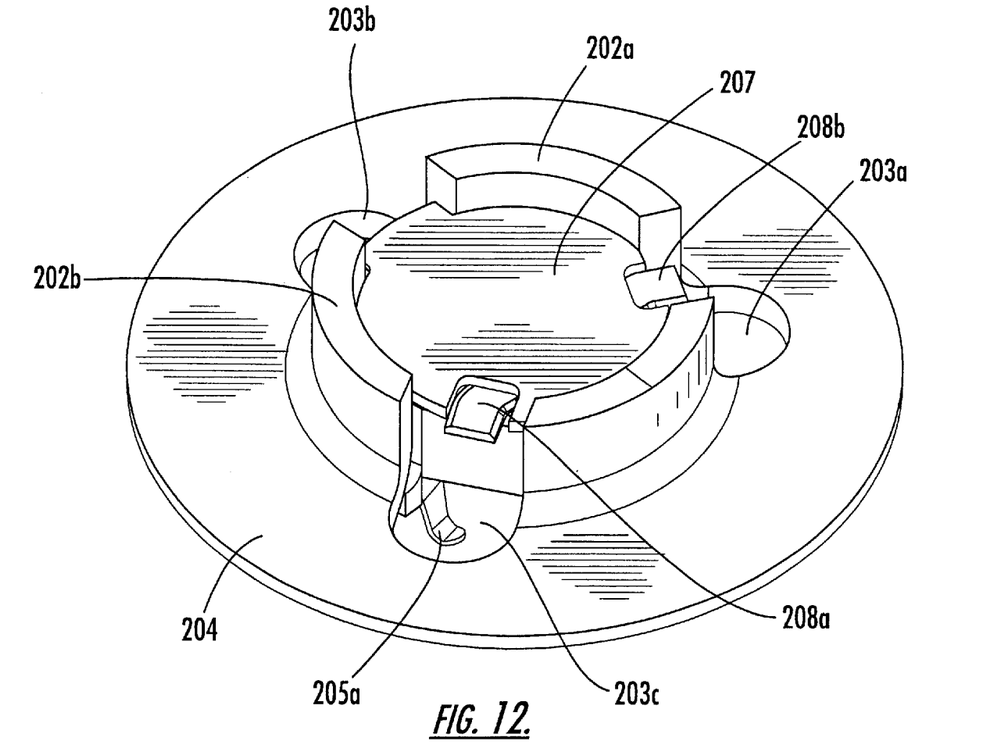
FIG. 12 shows the configuration of FIG. 11 with the upper cap installed.
Figure 13:
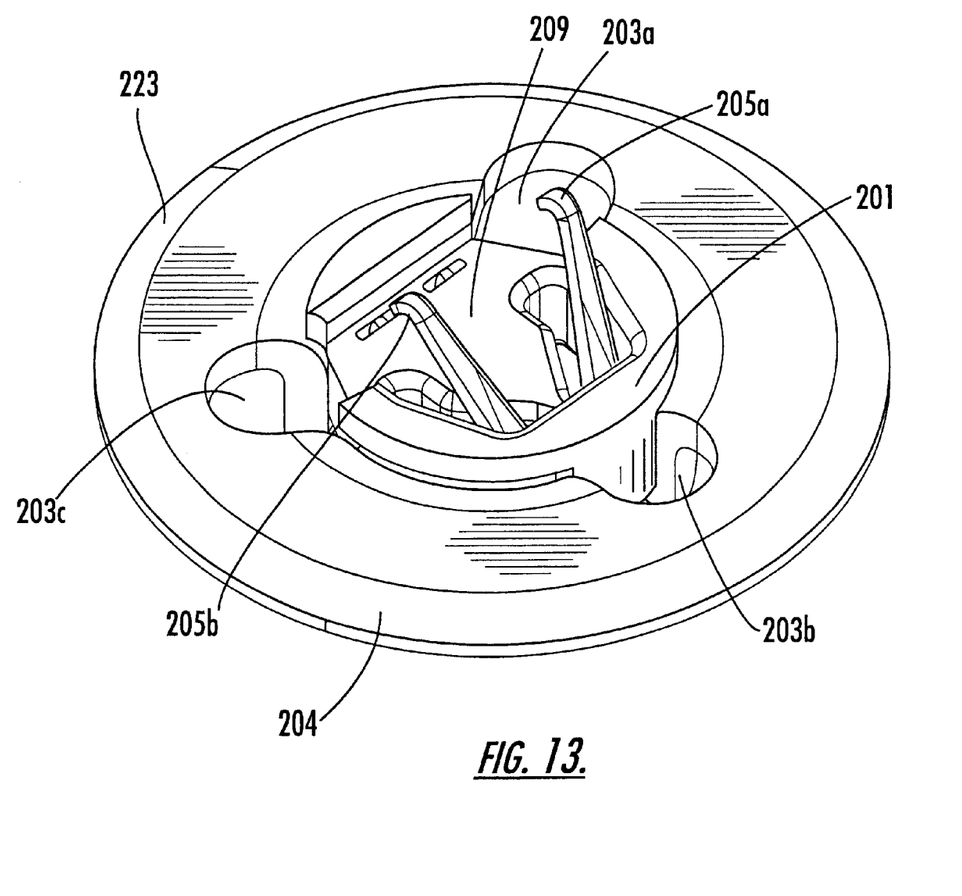
FIG. 13 shows a view of the underside of the connector shown in FIGS. 11—12.

An additional alternative embodiment of the invention is shown in FIG. 11. FIG. 11 shows connector 200 which comprises an insulative body 201 held within a metallic can 223 having ridges 202a, 202b, and 202c on its upper surface. Keyways 203a, 203b, and 203c provide passage from the upper portion of the connector to the lower portion of the connector. Contact element foot 205a is shown in FIGS. 11 and FIG. 12. Both contact feet 205A and 205b are shown in FIG. 13. Contacts 206a and 206b are shown near the upper portion of the connector in FIG. 11.

An upper cap 207 is shown detached form the connector in FIG. 11. The upper cap 207 provides protection for the electrical contacts, and further restricts airflow in those applications for which airflow restriction is advantageous. FIG. 11 shows the upper cap 207 detached from the connector. However, in FIG. 12 the upper cap 207 is installed in a location generally between the ridges 202a, 202b and 202c, generally above the contact elements. Contact tails 208a and 208b are shown emerging from the underside of the upper cap 207 in FIG. 12, and they usually are welded to the electronic component in a unified structure.

FIG. 13 shows the underside of the connector shown in FIGS. 11 and 12. In FIG. 13, the lower cap 209 is shown installed as a portion of the insulation body 201 shown near the center of FIG. 13. In some applications, the lower cap 209 may be integrated with the insulative body 201. In the assembly and manufacture of the connectors of the invention, contacts may be held together side-by-side on a contact carrier strip. A carrier strip provides in a continuous row a series of electrical connectors, and is used to manufacture numerous connectors from one strip of metallic material in a high speed stamping process.

It is understood by one of ordinary skill in the art that the present discussion is a description of exemplary embodiments only, and is not intended as limiting the broader aspects of the present invention, which broader aspects are embodied in the exemplary constructions. The invention is shown by example in the appended claims.

What is claimed is:

1. An electrical connector for engaging an electronic component to a circuit board, said connector comprising:
    an insulating body having an inner surface and an outer surface;
    a pair of connector elements configured within said body, each said connector element comprising contact feet having a proximal end and a distal end, the distal end of said contact feet extending beyond the outer surface of the insulating body for electrical contact with a circuit board, the proximal end of said contact feet extending into said body for electrical contact with an electronic component, further wherein the contact feet are configured to flex along their length to provide for contact against said circuit board;
    a can having an outer engaging surface operatively connected the electronic component and an interior operatively connected to the insulating body, the can further comprising at least one channel on its interior;
    wherein the channel of the can is configured to receive the foot of a connector element, thereby facilitating a path for said connector element within the channel that provides for contact of said connector element against the circuit board.

2. The electrical connector of claim 1, further comprising an orientation slot.

3. The electrical connector of claim 1, further wherein the proximal end of said contact feet comprise electrical contact pads.

4. The electrical connector of claim 1 in which the contact feet are S-shaped.

5. The electrical connector of claim 1 in which the length of the contact feet is greater than the diameter of the body.

6. The electrical connector of claim 1 in which the can comprises an upper flat surface, wherein the electronic component comprises a loudspeaker, further wherein the can electrically engages the loudspeaker upon the upper surface of the can.

7. The electrical connector of claim 1 in which the contact feet extend across the width of at least a portion of the can and at least a portion of the body.

8. The electrical connector of claim 1 in which the can comprises a portion of a carrier strip for a plurality of electrical connector devices.

9. The electrical connector of claim 1 in which the contact feet flex along their length to provide for pressing contact against the circuit board.

10. The electrical connector of claim 8 in which the carrier strip is comprised of iron.

11. An electrical connector for engaging a loudspeaker to a circuit board, said connector comprising:
    an insulating body having an inner surface and an outer surface;
    at least one connector element configured within said body, the connector element comprising contact feet, a proximal end and a distal end, the distal end of said connector element extending beyond the outer surface of the insulating body for electrical contact with a conductive member, the proximal end of said contact feet extending into said receptacle for electrical contact with said loudspeaker, further wherein a pad projection is located along the length of the connector element;
    a can having an outer engaging surface operatively connected to the loudspeaker, the can further enclosing at least a part of the insulating body;
    wherein the channel of the can is configured to receive a connector element.

12. The electrical connector of claim 11 in which the can further comprises a top ridge.

13. The electrical connector of claim 11 wherein at least one connector element is L-shaped.

14. The electrical connector of claim 11 in which the connector element has no more than one stress point along its length while flexed.

15. The electrical connector of claim 11 in which the body comprises at least one keyway.

16. The electrical connector of claim 11 in which there are at least two connector elements generally parallel to each other within the body, the elements forming a top space between each other.

17. The electrical connector of claim 11 in which the contacts interact with speaker connection wires.

18. The electrical connector of claim 16 in which the top space is occupied by an airflow reduction means.

19. The electrical connector of claim 18 in which the contacts comprise an upper surface and a lower surface, further wherein the air flow reduction means extends over the upper surface of the contacts.

20. The electrical connector of claim 18 in which the air flow reduction means extends below the lower surface of the contacts.

21. An electrical connector, comprising:
    an insulating body having an inner surface and an outer surface;

a pair of connector elements configured within said body, each said connector element comprising contact feet having a proximal end and a distal end, the distal end of said contact feet extending beyond the outer surface of the insulating body for electrical contact with a circuit board, the proximal end of said contact feet extending into said body for electrical contact with said electronic component, further wherein the contact feet are configured to flex along their length to provide for contact against said circuit board;

a can having an outer engaging surface operatively connected to the electronic component and an interior operatively connected to the insulating body.

22. The connector of claim 21 wherein the can further comprises at least one channel.

23. The connector of claim 22 wherein the channel is configured to receive the foot of a connector element.

24. The connector of claim 22 wherein the connector element is provided a pathway within the channel for moving vertically when resiliently contacting the circuit board.

25. The connector of claim 21 wherein the can provides a conductive contact surface for electrical communication with said electronic component.

26. The connector of claim 21 wherein the electronic component comprises a loudspeaker.

27. The connector of claim 21 wherein at least one connector element is adapted to flex along its length for engaging the circuit board.

* * * * *